United States Patent
Koehler et al.

(10) Patent No.: US 7,108,586 B2
(45) Date of Patent: Sep. 19, 2006

(54) METHOD OF CHEMICAL MECHANICAL POLISHING USING ABRASIVE PARTICLES OF ALKALINE EARTH METAL SALTS

(75) Inventors: Karl Koehler, Diekholzen (DE); Ferdinand Hardinghaus, Bad Hoenningen (DE); Jai-Won Park, Goettingen (DE)

(73) Assignee: Solvay Barium Strontium GmbH, Hannover (DE)

(*) Notice: Subject to any disclaimer, the term of this patent is extended or adjusted under 35 U.S.C. 154(b) by 45 days.

(21) Appl. No.: 10/870,423

(22) Filed: Jun. 18, 2004

(65) Prior Publication Data

US 2005/0048877 A1    Mar. 3, 2005

Related U.S. Application Data

(63) Continuation of application No. PCT/EP02/14221, filed on Dec. 13, 2002.

(30) Foreign Application Priority Data

Dec. 21, 2001  (DE) ................ 101 63 570

(51) Int. Cl.
  *B24B 1/00*  (2006.01)
(52) U.S. Cl. .......................... 451/41; 451/28
(58) Field of Classification Search .......... 451/41, 451/28, 65, 285–289
  See application file for complete search history.

(56) References Cited

U.S. PATENT DOCUMENTS

| | | | |
|---|---|---|---|
| 4,383,936 A | 5/1983 | Franz et al. | |
| 5,605,491 A * | 2/1997 | Yam et al. | 451/40 |
| 5,695,384 A | 12/1997 | Beratan | |
| 5,763,325 A | 6/1998 | Kishi et al. | |
| 6,110,832 A | 8/2000 | Morgan, III et al. | |
| 6,336,945 B1 * | 1/2002 | Yamamoto et al. | 51/309 |
| 6,413,287 B1 * | 7/2002 | Barber, Jr. | 51/298 |
| 6,565,422 B1 * | 5/2003 | Homma et al. | 451/67 |
| 2005/0048877 A1 * | 3/2005 | Koehler et al. | 451/41 |

FOREIGN PATENT DOCUMENTS

| | | |
|---|---|---|
| GB | 826332 A | 1/1960 |
| JP | 11012560 A | 4/1999 |
| JP | 2001001270 | 1/2001 |
| JP | 2001057349 | 2/2001 |
| JP | 2001170858 | 6/2001 |
| WO | WO 01/48807 | 7/2001 |
| WO | WO 01/85392 | 11/2001 |

* cited by examiner

*Primary Examiner*—Lee D. Wilson
(74) *Attorney, Agent, or Firm*—Crowell & Moring LLP

(57) ABSTRACT

Particles of strontium carbonate, barium carbonate, strontium sulfate and/or barium sulfate having a sufficient degree of fineness, especially when produced synthetically, are suitable as abrasive agents in chemical mechanical polishing (CMP polishing) of components, e.g., microelectronic components such as silicon wafers. The alkaline earth metal salt compounds are used as slurries in water and/or organic liquids and optionally may contain a dispersing agent, and preferably have a pH value of at least 8.

13 Claims, No Drawings

METHOD OF CHEMICAL MECHANICAL POLISHING USING ABRASIVE PARTICLES OF ALKALINE EARTH METAL SALTS

CROSS REFERENCE TO RELATED APPLICATIONS

This application is a continuation of international application no. PCT/EP02/14221, filed Dec. 13, 2002, designating the United States of America, and published in German as WO 03/054944, the entire disclosure of which is incorporated herein by reference. Priority is claimed based on Federal Republic of Germany patent application no. DE 101 63 570.2, filed Dec. 21, 2001.

BACKGROUND OF THE INVENTION

The present invention relates to the use of certain alkaline earth metal salts as auxiliary agents in chemical mechanical polishing (CMP method), particularly of microelectronic components.

In certain fields of the industry, components are often needed that have been polished to a certain profile on at least one side. For example, the components may need to be uniformly flat and have a low surface roughness. Components which may need polishing include, for example, optical components, semiconductor components and ceramics.

One method of manufacturing such components with a high degree of polish is the chemical mechanical polishing (CMP) method using polishing slurries. Chemical mechanical polishing is usually performed as described below. The workpiece to be polished, e.g., a silicon wafer, is positioned with the surface to be polished facing down on a rotating pressure plate (platen). The wafer is secured by a carrier. The wafer and platen rotate in the same direction. A polishing pad or polishing substrate with a polishing slurry is provided on the surface of the platen. The polishing slurry contains very fine abrasives such as silicon dioxide or cerium oxide.

When oxide layers are to be polished, a basic slurry is generally used, e.g., a slurry containing potassium hydroxide solution or ammonia water and having a pH in the range from 10 to 11. To polish metals such as tungsten, slurries which typically contain an oxidizing agent such as hydrogen peroxide and have a low pH, e.g., from 0.5 to 4, are used. U.S. Pat. No. 5,695,384 discloses the use of slurries in the neutral pH range, using colloidal silicon dioxide to which a soluble halide salt, e.g., sodium chloride has been added. Ceramics such as barium strontium titanate as well as other materials such as gallium arsenide, diamond, silicon carbide and other perovskite materials can be polished with such slurries.

SUMMARY OF THE INVENTION

The object of the present invention is to provide additional, readily usable abrasives which can be used in the CMP polishing method.

This and other objects are achieved in accordance with the present. invention by providing a method of polishing a component, the method comprising subjecting the component to chemical mechanical polishing with a polishing slurry comprising abrasive particles of at least one alkaline earth metal salt having a low solubility in water selected from the group consisting of strontium carbonate, strontium sulfate, barium sulfate and barium carbonate.

In accordance with a further aspect of the invention, the objects are achieved by providing a slurry comprising from 1 to 80 wt % of particles of at least one alkaline earth metal salt selected from the group consisting of barium carbonate, strontium sulfate, strontium carbonate and barium sulfate, and at least one liquid selected from the group consisting of water and organic liquids.

In accordance with the present invention, alkaline earth metal salts having a low solubility in water are selected from the group consisting of strontium carbonate, barium sulfate, strontium sulfate and barium carbonate and are used as abrasives in chemical mechanical polishing of components such as microelectronic components. Strontium carbonate and barium sulfate are preferred.

The alkaline earth metal salt is used in the form of a slurry. Aqueous slurries may be used or slurries which also contain organic fluids such as dihydroxy compounds (e.g., glycols) may be used instead of or in addition to water.

It is generally desirable to use a salt with a particle size which is as fine as possible. The average particle size d50 is preferably less than or equal to 0.3 μm, measured by the laser diffraction method (e.g., on a Coulter LS 230). It is particularly preferred for the average particle size d50 to be less than or equal to 0.2 μm. It is most especially preferable to use an alkaline earth metal salt in which d100 is less than or equal to 4 μm, less than or equal to preferably 1 μm, and in particular less than or equal to 0.4 μm.

Synthetic alkaline earth metal salts are particularly preferred. They can be produced in principle by reacting alkaline earth metal hydroxide, e.g., as an aqueous solution, with carbon dioxide or alkali metal carbonates or with sulfuric acid or an alkali sulfate. The required finely divided alkaline earth metal carbonate or alkaline earth metal sulfate can be prepared as described in the International Patent Applications WO 97/15530, WO 01/49609 and German Patent Application DE 100 26 791, where the carbonates or sulfates are precipitated by reacting corresponding bases with carbon dioxide or sulfuric acid, respectively, in a continuous mixing reactor in which shearing forces, transverse forces and frictional forces of intermeshing tools act on the reaction mixture at a high relative speed. The mixing reactor in this case operates according to the rotor-stator principle at a very high rotational speed (several thousand revolutions per minute).

The aqueous slurry contains 1 to 80 wt % alkaline earth metal salt. A ready-to-use slurry advantageously contains 1 to 15 wt %, preferably 5 to 10 wt % of the abrasive. A concentrate, e.g., for shipping, will advantageously contain high concentrations of the abrasive, e.g., up to 80 wt %, preferably 5 to 60 wt % or even more if desired. The slurry may contain the usual auxiliary agents. The remainder up to a total of 100 wt % is comprised of water, organic liquids and/or the conventional auxiliary agents which optionally may be present.

Dispersing agents are preferably included. Conventional dispersing agents may be used, e.g., polyacrylates. An example of a conventional agent which is commercially available is Dispex N40™ (Allied Colloids Ltd, Bradford, England). Dispersants assure a fine particle size and inhibit agglomeration and sedimentation.

In oxide polishing, the pH is advantageously greater than 8. Instead of or in addition to water, other liquids may also be used, e.g., the glycols and alcohols mentioned in U.S. Pat. No. 5,695,384.

This method can be carried out in conventional CMP machines. Rotating machines may be used but machines that operate according to the linear planarization method (linear planarization technology, LPT) may also be used.

This invention also relates to slurries containing strontium carbonate, strontium sulfate, barium sulfate or barium carbonate. These salts have a d50 less than or equal to 0.3 μm and are present in the slurry in an amount of 1 to 80 wt %. Preferred embodiments are described above.

The remainder up to a total of 100 wt % is formed by water and/or organic liquids, with a portion of the water and/or the organic liquid optionally being replaced by auxiliary agents as described above. A portion of the alkaline earth metal salt, e.g., maximally up to half of the weight, may be replaced by other abrasives such as $SiO_2$ or $CeO_2$. Dispersing agents are preferably included. The slurries may be produced in ball mills, for example, with the addition of dispersants.

The special advantage of strontium salts or $BaSO_4$ is that they are nontoxic.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of polishing a component, said method comprising subjecting said component to chemical mechanical polishing with a polishing slurry comprising abrasive particles of at least one alkaline earth metal salt having a low solubility in water selected from the group consisting of strontium carbonate, strontium sulfate, barium sulfate and barium carbonate, wherein the alkaline earth metal salt particles have an average particle size d50 which is less than or equal to 0.3 μm.

2. A method according to claim 1, wherein said alkaline earth metal salt is strontium carbonate or barium sulfate.

3. A method according to claim 1, wherein said component is a microelectronic component.

4. A method according to claim 1, wherein the alkaline earth metal salt particles have an average particle size d50 which is less than or equal to 0.2 μm.

5. A method according to claim 1, wherein the salt particles are composed of at least one synthetic alkaline earth metal salt.

6. A method of polishing a component, said method comprising subjecting said component to chemical mechanical polishing with a polishing slurry comprising abrasive particles of at least one alkaline earth metal salt having a low solubility in water selected from the group consisting of strontium carbonate, strontium sulfate, barium sulfate and barium carbonate, wherein the salt particles have a d100 less than or equal to 4 μm.

7. A method according to claim 6, wherein the salt particles have a d100 less than or equal to 1 μm.

8. A method of polishing a component, said method comprising subjecting said component to chemical mechanical polishing with a polishing slurry comprising abrasive particles of at least one alkaline earth metal salt having a low solubility in water selected from the group consisting of strontium carbonate, strontium sulfate, barium sulfate and barium carbonate, wherein the polishing slurry is an aqueous slurry which contains 1 to 80 wt % of the particles said at least one alkaline earth metal salt.

9. A method according to claim 8, wherein said aqueous slurry contains from 5 to 60 wt % of said at least one alkaline earth metal salt.

10. A slurry comprising from 5 to 60 wt % of particles of at least one alkaline earth metal salt selected from the group consisting of barium carbonate, strontium sulfate, strontium carbonate and barium sulfate, and at least one liquid selected from the group consisting of water and organic liquids.

11. A slurry according to claim 10, further comprising a stabilizing agent or dispersing agent.

12. A slurry according to claim 10, wherein said liquid is water.

13. A slurry according to claim 10, wherein said slurry has a pH value of at least 8.

* * * * *